UNITED STATES PATENT OFFICE.

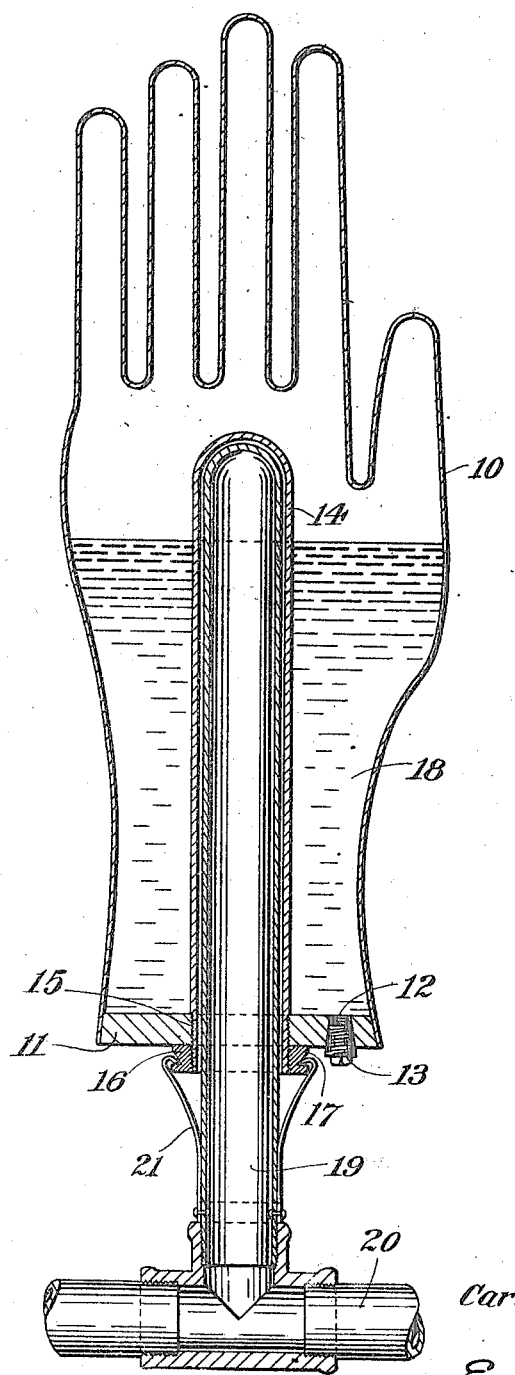

CARL S. WILLIAMS, OF NEW YORK, N. Y., ASSIGNOR TO REVERE RUBBER COMPANY, A CORPORATION OF RHODE ISLAND.

HEATED FORM FOR RUBBER-DIPPED GOODS.

1,163,053.  Specification of Letters Patent.  Patented Dec. 7, 1915.

Application filed March 26, 1915.  Serial No. 17,144.

*To all whom it may concern:*

Be it known that I, CARL S. WILLIAMS, a citizen of the United States, residing in the city of New York, county of New York, and State of New York, have invented certain new and useful Improvements in Heated Forms for Rubber-Dipped Goods, of which the following is a full, clear, and exact description.

My invention relates to forms for use in the production of vulcanizable plastic articles by the so-called dipping method.

It is customary in making articles of rubber or other vulcanizable plastics to submerge or dip a form having the configuration of the desired article into a bath of the plastic brought to a fluid or semi-fluid state by means of a volatile solvent. After each submersion or dip of the form, it is exposed to the air for a sufficient interval to allow the solvent to evaporate from the coat of material on the form. When the form has been thus dipped and dried a sufficient number of times to produce a coat of the plastic material to the desired thickness thereon, the vulcanizable plastic upon the form is subjected to a vulcanizing treatment.

The present invention provides a form which is capable of being heated uniformly throughout whereby the time required in evaporating the solvent in the plastic accumulated upon the form is materially reduced.

With the above and other objects in view the invention consists in certain novel details of construction and combination of parts hereinafter fully described and claimed it being understood that various modifications may be resorted to within the scope of the appended claims without departing from the spirit or sacrificing any of the advantages of the invention.

The invention will be readily understood from the following description taken in connection with the accompanying drawing in which the figure is a longitudinal sectional view through a form embodying my invention and associated with a heater.

In the present embodiment of the invention I have illustrated a glove form 10, although it is to be understood that the invention is not limited to this particular type of form but includes forms of all other types adapted for use in connection with the dipping process of manufacturing vulcanizable plastic articles. The form 10 is constructed in the nature of a hollow shell, and is preferably constructed of bronze although other desired materials may be used. The form is closed at the wrist portion by a closure 11 which also is preferably formed of bronze and is sealed air tight to the body of the form. An opening 12 is formed in the closure and a removable plug 13 seals this opening. A tube 14 open at one end, is threaded at the open end in an axial opening 15 formed in the closure and projects longitudinally into the form, there being a nut 16 threaded on to the tube outside of the closure, which nut is provided peripherally with a groove 17 the purpose of which will be presently explained.

In carrying out the invention, the above described form is inverted from the position shown in the drawing and is filled about two-thirds full with a volatile liquid 18, such as for instance gasolene. The form is then heated in any suitable manner until the gasolene boils freely, it being understood that the plug 13 is removed prior to such heating operation, so that the gasolene vapor may pass into the atmosphere. After the liquid has boiled for a sufficient period of time to assure of there being only a vapor of gasolene together with gasolene liquid in the form the plug 13 is inserted and the form allowed to cool. Since the form was sealed while the liquid was boiling, there will exist within the form only the vapors of the liquid together with a quantity of the liquid itself.

In practice the form in the position shown in the figure is inserted upon a pipe 19 which is in communication with a supply pipe 20 from any suitable source of heat, there being spring fingers 21 on the pipe 19 that spring into the groove 17 of the nut 16 and anchor the form in place. Heat transmitted through the pipes 19 and 14 to the liquid raises the vapor pressure of the liquid and vapor will come off the surface thereof. If any part of the form is cooler than the heated liquid, condensation at that point will occur with a resultant heating effect which will be equal at all points in the form, thus insuring an even heating of the form throughout. During the dipping operation, wherein the form is alternately swung into and out of the bath, a washing back and forth of the liquid 18 will occur in the form thereby effecting uniform heating of the form throughout.

Having thus described my invention, what I claim and desire to protect by Letters Patent is:

1. An apparatus for building rubber dipped goods, comprising a hollow form filled with a volatile liquid and vapors thereof, and means for transferring heat to the form through the medium of the liquid and vapors thereof.

2. An apparatus for forming rubber dipped goods embodying a hollow form sealed against entry of air to the interior thereof, a heat transferring medium in said interior, and means for heating the form through the instrumentality of said medium.

3. A form for manufacturing rubber dipped goods embodying a shell, a tube projecting into the interior of the shell for the conduction of heat thereto, and a volatile liquid confined within the shell around the tube.

Signed at New York, N. Y., this 23d day of March.

CARL S. WILLIAMS.